United States Patent [19]

Jenny et al.

[11] 4,032,899
[45] June 28, 1977

[54] APPARATUS AND METHOD FOR SWITCHING OF DATA

[75] Inventors: Christian Jakob Jenny, Thalwil; Karl Albert Kuemmerle, Siebnen, both of Switzerland

[73] Assignee: International Business Machines Corporation, Armonk, N.Y.

[22] Filed: Jan. 19, 1976

[21] Appl. No.: 650,473

[30] Foreign Application Priority Data

May 5, 1975  Switzerland ............... 5781/75

[52] U.S. Cl. ............................................. 364/200
[51] Int. Cl.² ....................................... G06F 15/16
[58] Field of Search ........................... 340/172.5

[56] References Cited

UNITED STATES PATENTS

| | | | |
|---|---|---|---|
| 3,214,739 | 10/1965 | Gountanis et al. | 340/172.5 |
| 3,629,854 | 12/1971 | Hauck et al. | 340/172.5 |
| 3,693,161 | 9/1972 | Price et al. | 340/172.5 |
| 3,964,056 | 6/1976 | Charpentier et al. | 340/172.5 |
| 3,970,994 | 7/1976 | Jenny | 340/172.5 |

OTHER PUBLICATIONS

Belgian Publication: "Scientific Bulletin from A.I.M.," 88th year, 1975, No. 2, Apr.-May-June, pp. 140-146, Article from Beeforth, et al., Further Work on Data Communication Systems at the University of Sussex, pp. 143 and 144, Point 3.3, FIG. 2.
UK Publication: "The Radio and Electronic Engineer," vol. 45, No. 3, Mar. 1975, pp. 131-137, Article from Halsall: A Microprocessor-Controlled Interface for Data Transmission, pp. 131 and 132, paragraph 2; FIG. 1; p. 136, FIG. 8.

Primary Examiner—Raulfe B. Zache
Attorney, Agent, or Firm—Robert Lieber

[57] ABSTRACT

Apparatus and method for carrying out data switching; e.g. at a store-and-forward exchange node in a data communication network. Plural processors operate relative to multiple ports and traffic storage queues, partially on an exclusive basis and partially on a shared basis, to effectuate switching of data traffic with balanced sharing of the aggregate processing load. The processors control traffic processing functions (reception, storage and output transfer) on a varied assignment schedule. Supervisory signals exchanged between processors indicate status and destinations of currently stored traffic loads. The scheduling of output traffic to ports is handled by individual processors on an exclusive assignment basis. When a port is available to handle a given traffic segment (packet) destined for that port the respective processor having exclusive output scheduling responsibility for that port signals such availability to the processor having current responsibility over the transfer of said segment. The latter processor then executes the operations required to complete the transfer.

12 Claims, 8 Drawing Figures

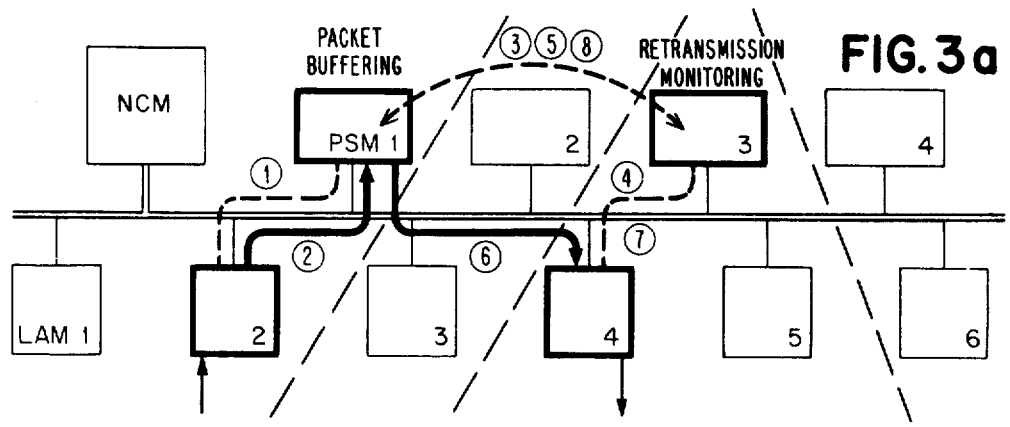
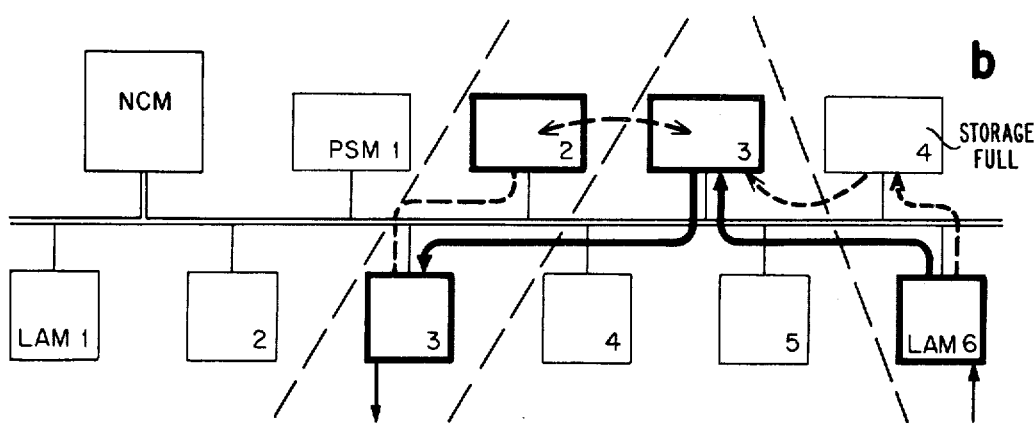
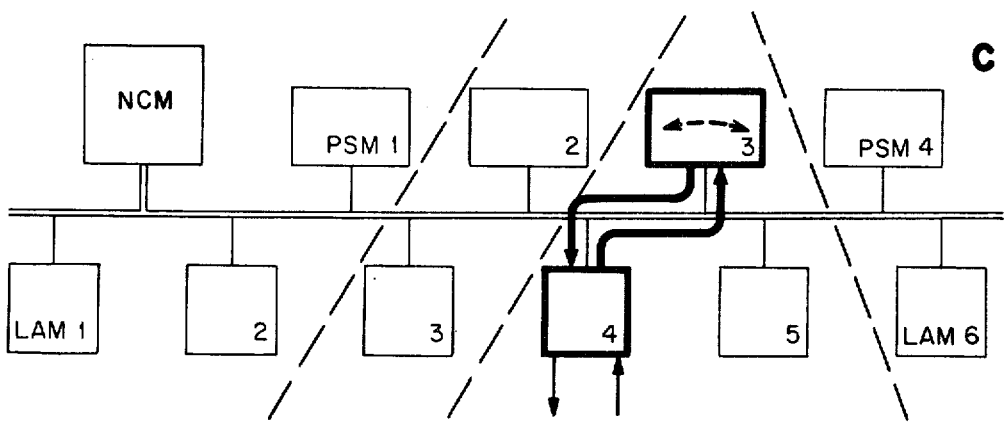
FIG. 3a, b, c

APPARATUS AND METHOD FOR SWITCHING OF DATA

CROSS REFERENCES TO RELATED PATENT APPLICATIONS

U.S. patent application Ser. No. 570,890 by Port et al, filed Apr. 23, 1975, now U.S. Pat. No. 3,988,545.

BACKGROUND OF THE INVENTION

The invention is concerned with an arrangement for switching data between any two of a plurality of ports, and a method for operating said arrangement.

A data transmission network serving a large number of terminal units requires switching nodes which can selectively transfer data arriving at any one of a plurality of lines attached to the node to any other line attached to the same node. The lines may be individual lines or trunks shared in multiplex mode for plural connections.

Data can be transferred through a network in circuit-switched mode, i.e. over a reserved connection, or in store-and-forward switched mode, i.e. in blocks from node to node with intermediate buffering of each block. An integrated network handling both kinds of traffic may be desirable for certain reasons.

For block-switching (packet-switching) several systems are known in the art which contain data processing units (processors). The switching arrangements known in the art have either a common storage and a common processing unit which are used for all attached lines (ports), or they comprise a plurality of processors cooperating with one, or a plurality of, storage units common to all processors.

The first (uniprocessor) type of system must be designed ab initio for the maximum traffic anticipated. This is incompatible with gradual incremental growth which is often desirable. Also, the processing unit is required to be very powerful so as to be able to control operation of the whole switching arrangement and scheduling of all switching transactions.

In known systems of the second (multiprocessor) kind, the modular structure is advantageous for incremental growth. However, many additional data transfers are necessary, partly to effectuate exchange of traffic between the processing units (if these units are available to all ports of the system on an arbitrary assignment schedule) and partly to exchange supervisory information (because all processing units must have complete information on current allocations of the common storage and compete with each other for storage accesses). These additional data transfers and the necessity for the processor modules to have complete information on storage allocations limit the number of such processor units which can be combined in a unified exchange system. As more and more processing units are added, there is a saturation effect; i.e. a maximum switching efficiency is reached which cannot be increased despite addition of more processing units. In turn this imposes limits — in multiprocessor systems which have common storage separate from the processors, or in which an arbitrary assignment of processors to individual switching transactions is made — on the data throughput capability which can be achieved and thereby may prevent economic and orderly fulfillment of future growth requirements.

SUMMARY OF THE INVENTION

It is an object of the invention to devise a switching arrangement and method in which plural switching processor units can achieve increased data throughput per unit.

A further object is to be able in such a system to increase switching capacity by adding processor modules without reaching saturation.

Another object of the invention is to be able in such a switching system to have functions efficiently taken over by another switching processor unit when one unit fails, without having to extensively reorganize the system.

Subject of the invention is an arrangement for switching data between any two of a multiplicity of ports, comprising a plurality of identically structured switching processor modules, characterized in that each switching processor module includes: storage and transfer means for storage of data packets received at ports until said packets can be retransmitted at scheduled other ports; table means for indicating transfer assignments, between respective switching processor modules and ports, and routing information; means for queue buffering indications of all data packets which are stored in any of the switching processor modules and are scheduled to be retransmitted via ports over which the respective switching processor module has exclusively assigned responsibility for output monitoring; and transfer means for transferring data packets between any port and any one of the switching processor modules.

Also subject of the invention is a method of operating this switching arrangement, which method is characterized in that for each transfer of a data packet the following operations are performed:

the data packet is assembled and stored in an allocated storage section of one of the switching processor modules;

a retransmission request is transferred to that switching processor module which has exclusive responsibility for scheduling traffic on the "output" port to which the data packet is to be transferred;

an availability indication is transferred from the last-mentioned switching processor module to the first-mentioned switching processor module when the respective output port is available to accept the data packet;

the data packet is transferred from the allocated storage section of said first-mentioned switching processor module to the respective output port.

The disclosed arrangement and method allow the use of relatively simple processors for switching functions, and the use of a large number of parallel processor modules to increase the throughput without limitation by saturation. The functions of providing synchronous (circuit-switched) connections and virtual (translatable) connections, as well as special functions (such as reconfiguration when a module fails, etc.), can be dealt with separate from the switching of data packets and may be executed by a special unit which need not be interrupted for data switching operations. The presently suggested solution also allows an integration of circuit-switching and store-and-forward switching at a single switching node and, if different line attachment modules are used, a direct circuit-switching of data between these latter modules without involving the switching processor modules provided for store-and-forward switching.

A preferred embodiment of the invention is described in the following, with reference to the drawings.

BRIEF DESCRIPTION OF THE DRAWINGS

FIGS. 3a, 3b and 3c show various possibilities of cooperation between processor modules and line attachment modules;

DETAILED DESCRIPTION

INTRODUCTION

In the switching node apparatus to be described herein the functions of setting up connection associations between ports and of general control are executed in one specific processor unit while the switching functions per se are executed by separate units.

The ports and associated external transmission lines (or channels) are connected in groups by line attachment modules. The transactions for store-and-forward switching of data packets are separated into two sub-functions, i.e. the processing (reception, compilation and storage) of the data packets and the scheduling of output retransmissions. For these functions processor modules are provided with sufficient storage capacity, to cooperate in pairs for executing the two sub-functions for each data packet transfer. Due to a predetermined assignment between the line attachment modules and the processor modules a lower overhead for storage and exchange of housekeeping data is achieved.

Buffer storage requests for the transfer of any data packet are issued directly by the line attachment modules to the processor modules without using a central distribution or assignment unit. Each processor module is responsible by itself for the administration and assignment of its storage resources.

The large flow of store-and-forward switched traffic is separated into many smaller flows. Thus the many requisite tasks can be executed simultaneously by many identical program modules and functional units. The tasks which must be executed for data packet switching (except for the establishment of a virtual connection) are short, simple and almost independent of each other and therefore do not require complex processors. No operating system is required, only a few executive routines.

An important point of the suggested solution is the fact that the autonomy of each processor module is purposely restricted. Though each processor module has the capacity to execute all functions necessary for data packet transfer, each module keeps the current operating data only for those ports for which it is currently working. By this restriction of processor autonomy which is possible by the predetermined assignment between processor modules and line groups, and furthermore by the splitting of functions associated with packet transfer into two sub-functions executable by separate modules in paired cooperation, the overhead operations which are the eventual cause of saturation blocking are considerably reduced.

SYSTEM

Figure 1:
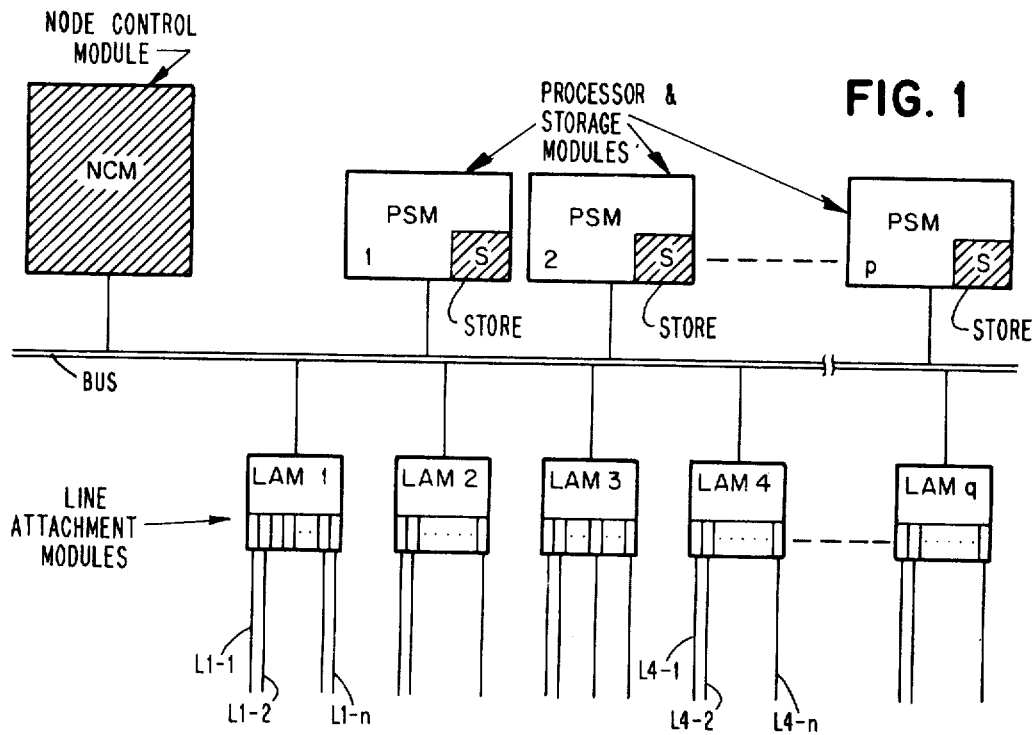
FIG. 1 contains a general block diagram of the switching arrangement which is described in an environmental embodiment.

FIG. 1 shows the principal design of a switching node in which the present invention is used. Relative to any port the node can be either a terminal node (origin or termination node) or a transit (intermediate) node. It comprises three different kinds of modular functional units which are designated in the following as "modules":

line attachment module LAM processor and storage module PSM (designated in the following "processor module")

node control module NCM

All modules are connected to each other by an arrangement of multiple interconnection lines BUS. All internal exchange of information is effected over this arrangement of lines in the form of addressed data blocks.

Each line attachment module LAM includes a plurality of ports for the respective attached transmission lines; e.g. lines L1-1, L1-2,...L1-n associated with LAM 1. These lines may be trunk lines connected to other switching modules or they may connect directly to origin or termination terminal stations. Different transmission rates may be provided for the various lines. Each line attachment module comprises (FIG. 4) buffer registers and simple control circuitry used for exchanging data and control information with the attached lines and also with other modules (LAM, PSM and NCM).

Of course a plurality of the channels which, in this description are designated and shown as "lines", can be combined in multiplex mode on one transmission line in order to optimize utilization of existing transmission resources. Apparatus for multiplexing and demultiplexing are well known, however, and therefore need not be described here in more detail. For simplicity all channels which are connected through an addressable "port" to a line attachment module are designated as lines (L1-1, L1-2, etc.) having "local" or "trunk" connection utility.

It is assumed that on each line either circuit-switched traffic or store-and-forward switched traffic can be transmitted. The combination of both traffic modes in multiplex operation for remote transmission is disclosed in (1) U.S. patent application Ser. No. 570,890 by Port et al, filed Apr. 23, 1975; and (2) "Multiplex Performance for Integrated Line and Packet Switched Traffic" by K. Kummerle and "Flexible Multiplexing for Networks Supporting Line Switched and Packet Switched Data Traffic" by P. Zafiropolo, both published in ICCC 74, Stockholm, pp. 507–523, August 1974.

Each processor module PSM comprises a store (S) and processing circuitry which are required for the buffered transfer of data packets relative to the lines attached to the LAM units. The PSM units provide for the compilation, buffering and retransmission of data packets in connection with the LAM units. Some details of a processor module will be described in connection with FIG. 5.

The node control module NCM comprises a processor and storage circuitry. It controls and monitors the operation of the switching node. It contains the necessary programs for establishing and terminating connections (virtual and circuit-switched) and provides for general auxiliary functions as e.g. accounting and reconfiguration of the node in case of failure of a module. Furthermore it contains programs which are used when errors occur or in particular situations where the PSM units or the LAM units are unable to correct an error or deal with the situation. The node control module does not participate in the switching proper of data, i.e. the transfer between incoming and outgoing lines. Only the LAM units and the PSM units serve this purpose.

The number of line attachment modules LAM is a function of the number of lines to be attached. The number of processor modules PSM is determined by the expected traffic in store-and-forward mode. The latter is a function of the number of lines to be served, the kinds of data transmitted, the transmission rate, etc. For control of the switching node a single node control module NCM would be sufficient in principle if designed with enough capacity. However, provision can be made for two or more NCM units to ensure availability or orderly growth of the nodal system.

The switching node disclosed as an embodiment is designed for integrated operation, i.e. for circuit switching as well as for store-and-forward switching. This will be explained with reference to FIG. 2. To simplify explanation in this figure only two PSM units and two LAM units are shown.

Only one common signaling method is provided for both switching modes. In both switching modes a connection through the whole network is established before the actual transmission of data. Calling party, network units and called party must indicate that they are ready and able to receive and/or to respond to requests. For circuit switched mode a unique point-to-point transmission path is fully reserved. For store-and-forward switching a transmission path is assigned only when data is actually transmitted and released at the end of such transmission. Logically, however, the connection is maintained, as if the path were actually reserved, until one of the participating parties requests release of the connection. Such logical connection is designated as "virtual connection".

For establishing a virtual connection the node control module effects entries into the source and destination tables in the end (origin or "point-of-entry" and termination or "point-of-exit") nodes. These tables will be explained in detail below.

Figure 2:
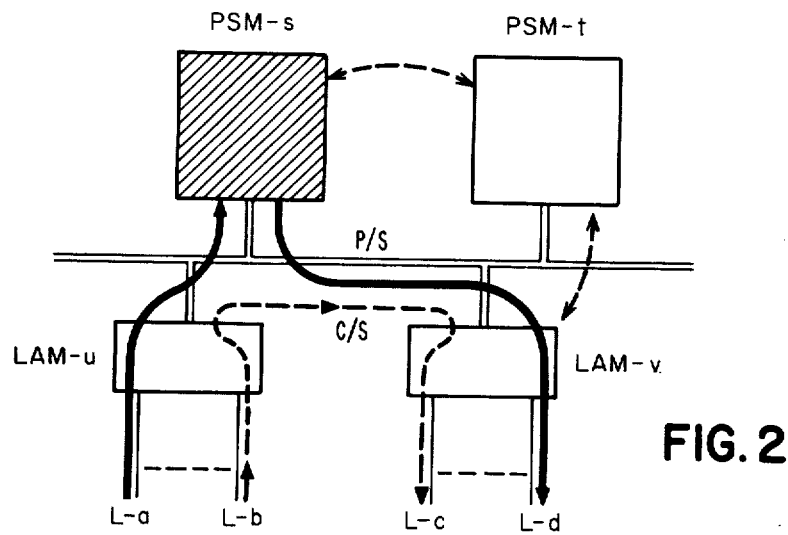
FIG. 2 shows selected parts of the switching arrangement of FIG. 1 representing data flows for combined circuit switching and store-and-forward switching.

For circuit switched transmission only LAM units are used after a connection is established. In FIG. 2 a circuit switched connection exists between lines L-b and L-c. Line attachment module LAM-u collects the bits received from line L-b in a buffer. After receiving 32 bits (4 bytes) an internal transfer block ITB is generated by LAM-u. This block comprises the data (32 bits), and the addresses of the output unit LAM-v and output line L-c. It is transferred to LAM-v which buffers the data contained in the ITB in its output store assigned to line L-c. From there the data is dispatched to that respective line. Some additional details on the mode of operation with internal transfer blocks ITB and of their formats are given below.

For store-and-forward switched transmission the LAM units and PSM units are used cooperatively. It is assumed that a virtual connection exists between lines L-a and L-d (appropriate table entries having been effected). During the setting up of the connection LAM-u is informed by the node control module NCM that processor module PSM-s is assigned for storage and transfer processing of all data packets received from line L-a through unit LAM-u. A second processor module PSM-t has been permanently assigned (by table entries) to schedule all outgoing transmissions of data packets to LAM-v.

When the first character of a data packet is received on line L-a, LAM-u sends a request to PSM-s (by an internal transfer block ITB) to provide a storage section for this line. PSM-s allocates a free storage section for packet assembly. All subsequent characters are sent directly to PSM-s and stored in said section. When all of the data in a packet is assembled PSM-s either affixes a header containing the final destination (termination) address of the packet (if the packet originated at a terminal attached to L-a) or it retains destination address information already contained in the packet header (if the subject node is a transit node for that packet). It further effects error tests and then dispatches a retransmission request to PSM unit t. PSM-t contains all necessary status information concerning the lines attached to LAM-v. As soon as line L-d (the output line) is available to accept and retransmit the data packet acquired from L-a PSM-t returns an alerting indication to PSM-s which then proceeds to transfer the packet in 4 byte groups to LAM-v (which in turn buffers and forwards to line L-d). The scheduling processor module PSM-t is not involved in this transfer.

In parts a, b and c of FIG. 3 three different packet switching situations are represented which can occur in the switching node of FIG. 1 when the basic procedure of FIG. 2 is applied. The assignments between line attachment modules and processor modules are indicated by inclined dashed lines. FIG. 3a characterizes the situation of FIG. 2 without the circuit-switched transmission. The transfer of a data packet between lines (ports) associated with LAM 2 and LAM 4, respectively, is effected by the following procedural steps (refer to corresponding numbers in FIG. 3a):

1. LAM 2 signals PSM 1 to allocate a free storage section to the respective input line of LAM-2.

2. A data packet received via said input line is assembled in said storage section character by character.

3. A retransmission request is dispatched from PSM 1 to PSM 3 which is assigned to monitor traffic on LAM 4. PSM 3 loads a pointer word into a queue storage for the designated output line.

4. Status of the designated line is monitored to determine its availability for output of said assembled packet.

5. When the pointer word for the respective data packet is at the top of the queue and the designated line is available a transfer request is dispatched from PSM-3 to PSM 1.

6. PSM-1 transfers the buffered data packet over the common BUS directly to LAM 4.

7. LAM 4 carries out the transmission to the next node and relays receipt acknowledgement (or transmission error indication) from the next node to PSM 3.

8. PSM 3 signals PSM 1 to either release the allocated storage section or (upon error notification) repeat transmission of the data packet (which is still stored) or alert the node control module NCM to initiate exceptional operation.

FIG. 3b shows the situation in which a request from LAM 6 to PSM 4 (the processor module assigned by the node control module NCM to service transfers from LAM 6) for allocation of a packet storage section cannot be honored by PSM 4 because all of the storage capacity in PSM 4 is occupied. An internal transfer block ITB (detailed below) is then automatically passed to the neighboring module PSM 3 where, free storage being available, a section is allocated. An acknowledgement message is sent to LAM 6 which stores the new receiving address in a register and thereafter sends all characters of the data packet directly to PSM 3. Further operations are as described above (i.e. cooperation with PSM 2 for monitoring the availability of the outlet port of LAM 3 and direct transfer of the data packet from PSM 3 to LAM 3).

Finally FIG. 3c illustrates the handling when input line and output line are in the same group, i.e. are attached to the same line attachment module (LAM 4). The compilation and buffering of a data packet and the monitoring of output availability are effected in the same processing module (PSM 3) although both functions are separate.

However, in case c two different processor modules may be used if:

a. the node control module has assigned to unit LAM 4 a first PSM for reception and another PSM for monitoring output port availability for retransmission, or (b) the same PSM has been assigned for both functions but its buffer storage is filled and thereby unavailable for reception of data packets.

To summarize the following can be said:

After "establishment" of virtual connection, store-and-forward switching of data blocks is effected autonomously by the line attachment modules and processor modules. The PSM's can work together in pairs to execute the separate sub-functions of output scheduling and data packet transfer.

The processor modules are identically structured and interchangeable. There is, however, a preferred association between line attachment modules and processor modules with regard to the input function and there is a fixed association between line attachment modules and processor modules with regard to the retransmission scheduling function (the latter association is changed only by node control module NCM in case a PSM unit fails). The assignments are determined by tables (further details below).

Because there may be overlapped reception and retransmission of many data packets over many virtual connections, each PSM may cooperate simultaneously with a plurality of other PSM's. Ordinarily however the transfer of each data packet involves only two PSM units.

DATE EXCHANGE BETWEEN THE MODULAR UNITS/INTERNAL TRANSFER BLOCKS

All data and supervisory control information is transferred between modules through the multiple BUS line arrangement. Transfer is effected by addressed blocks of equal size (fixed length) which are designated internal transfer blocks ITB. Each module can dispatch internal transfer blocks which are addressed to other modules via the BUS. Each module accepts automatically the ITB blocks which are addressed to it from the BUS. Suitable buffer or queueing stores are provided for both transfer directions at the interfaces (i.e. from module to BUS and from BUS to module). For implementing the BUS arrangement there are various possibilities. A number of examples are given in the survey article "A Systematic Approach To The Design of Digital Bussing Structures" by K. J. Thurber et al, AFIPS Conference Proceedings, Vol. 41, Part II Fall Joint Computer Conference, 1972. Therefore, no more details are given here.

Three different types of internal transfer blocks are provided. They all have the same size and comprise four bytes of control information and four bytes of data (that is, a total of 64 bits). The formats of the three types of internal transfer blocks are shown in Table I:

TABLE I

INTERNAL TRANSFER BLOCK FORMATS (64 Bits per Block)

a. Basic Format (BF)
 2 Bits — Format Identification
 6 Bits — OP Code
 8 Bits — Module Address
 16 Bits — Address Field
 32 Bits — Data
b. Data Format (DF)
 1 Bit — Format Identification
 2 Bits — OP Code
 5 Bits — Number of Bits (Length)
 8 Bits — Module Address
 16 Bits — Address Field
 32 Bits — Data
c. Control Format (CF)
 2 Bits — Format Identification
 6 Bits — OP Code
 8 Bits — Module Address
 16 Bits — Address Field
 10 Bits — Additional Module Address
 6 Bits — Counter Field
 16 Bits — Miscellaneous "OP-Code" indicates the desired operation (reading, writing, storage request receipt acknowledgement, etc.). The "Module Address" identifies the destination module. The "Address Field" in the control and data formats designates the address in the receiving module (e.g. storage address for data input) and in the case of the basic format it contains the origin address. The "Additional Module Address" in the control format block designates the source module. The "Counter Field" in the control format block designates a predetermined number representing the number of modules through which the respective block can be passed (some details are given further below).

Internal transfer blocks ITB can be issued by all three kinds of modules. Data ITB's transport data either directly between two LAM units (i.e. circuit switched transmission) or between LAM units and PSM units (i.e. store-and-forward switched transmission). Control ITB's transport supervisory control information between processor modules for controlling data packet transfer and also from an originating line attachment module to a processor module at the respective origin node.

Examples of control ITB use:

Signaling for allocating of a storage section, acknowledging storage allocation, indicating output line availability, indicating completed transmission, etc.

Node control module NCM transmits and receives internal transfer blocks of the basic format.

In each module input queue stores are provided for reception of data and control information in the ITB format. Separate queue stores can be provided for the different types of transactions, particularly for requests for storage allocation, for input of data into storage sections which are already allocated, and also for input of pointer words into retransmit queue stores. Each queue store then has an internal priority and is scanned regularly. If lines with a particularly high transmission rate are attached to the node additional intermediate buffers of sufficient capacity can be provided to permit multiplex data input into storage sections which are already allocated.

If a PSM is unable to execute a requested operation (especially storage allocation for packet transfer) it passes the request (i.e. the complete ITB block) over to a "neighboring" PSM. Conceivably this next PSM may have to pass the internal transfer block in turn to its "neighbor". Eventually a PSM unit is found which has enough free capacity to handle the request. By the counter field within the control ITB this passing on can be restricted to a maximum number. This passing on procedure corresponds to "polling" operation in a loop configuration if the neighbor modules are connected in a loop. In other words line attachment modules pass requests to processor modules over connections logically organized in "star" configuration while the passing on between processor modules in case of storage overflow is effected in a logical "loop" type configuration. Each PSM contains an identification of its neighbors which can be inserted and changed by the node control module.

DETAILS ON THE MODULES AND THEIR OPERATION

Figure 4:
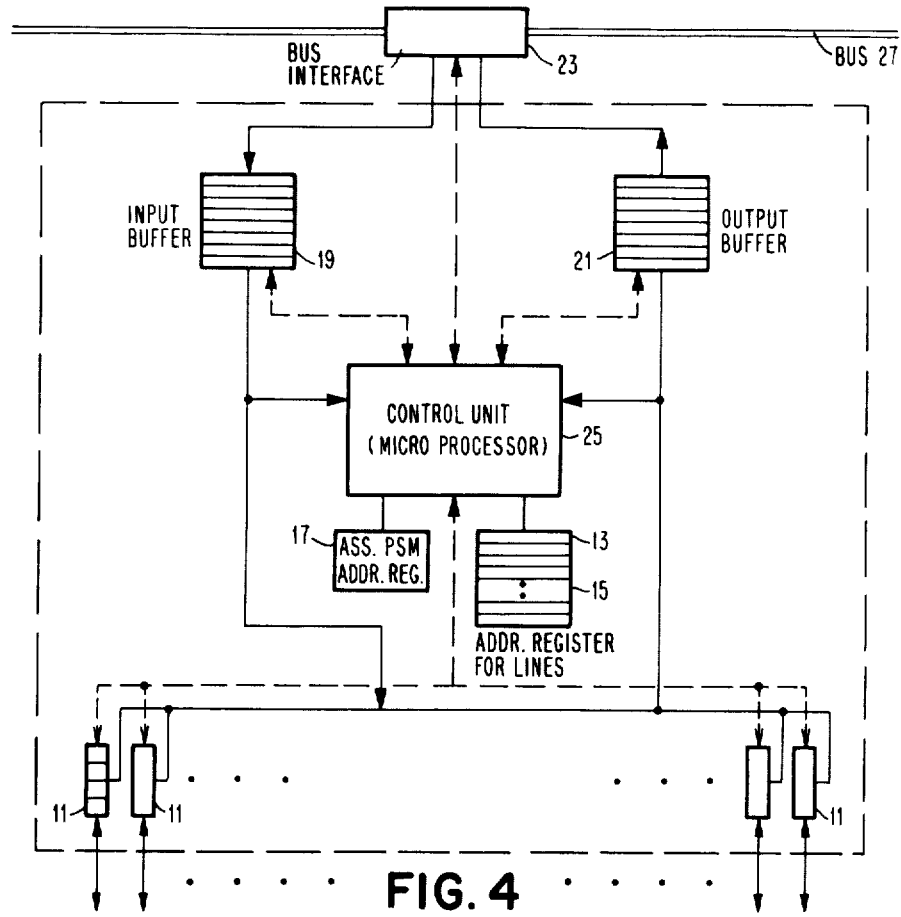
FIG. 4 shows certain details of a line attachment module used in the disclosed switching arrangement.
Figure 5:
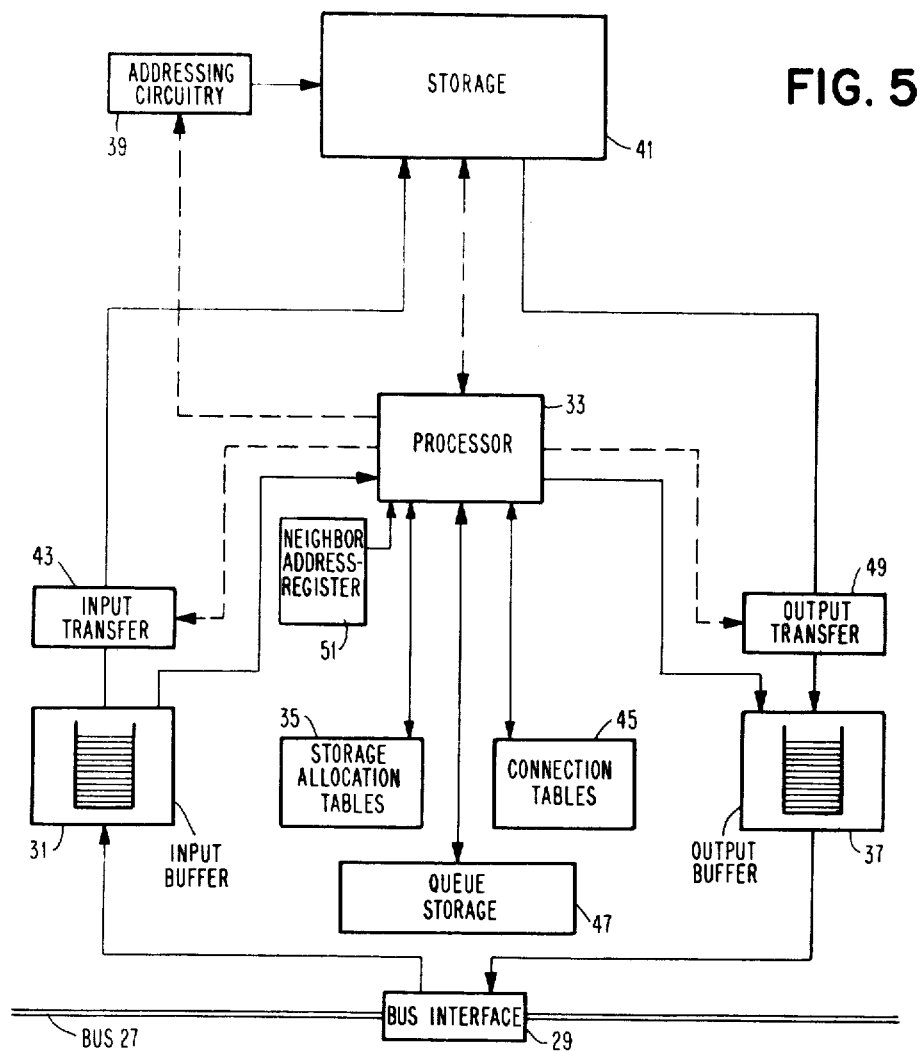
FIG. 5 shows details of a processor module of the disclosed switching arrangement.

With reference to FIGS. 4 and 5 and Table II further details of the line attachment modules LAM, the processor and storage modules PSM and of their operation will now be described.

LINE ATTACHMENT MODULE

FIG. 4 shows some details of a line attachment module LAM. Each LAM unit contains a plurality of line buffers 11 each of which has a capacity of four characters (bytes). For each line there is also provided an associated address register 13 for incoming transmissions. These address registers may be combined in a storage block 15. Each address register contains either the address of another LAM unit and a line attached to it to which characters received on the associated line must be transferred (circuit-switched transmission), or the address of a PSM unit to which characters of data packets received on the associated line must be forwarded (store-and-forward transmission). Each address is stored in the respective LAM unit by the node control module NCM when the associated connection is established.

A separate address register 17 for outgoing transmissions stores the address of the associated processor module which contains the output pointer queues and is responsible for monitoring data packet transmissions from the respective LAM unit. This address register is loaded by the node control module.

Input buffer 19 and output buffer 21 connect between BUS interface unit 23 and line buffer 11 or control unit 25.

Control unit 25 comprises a microprocessor for executing the following functions: scanning line buffers; generating internal transfer blocks (ITB's) comprising data from line buffers and associated addresses; analyzing received internal transfer blocks and forwarding the data contained in them to the line buffer (or to an address register at the time when a connection is established).

As mentioned above the LAM unit may include multiplexors and demultiplexors if multiplex lines are attached. These multiplexing facilities however are not described here because they are well known in the art.

PROCESSOR AND STORAGE MODULES PSM

Important parts of each processor module are tables designating the sub-function assignments, the virtual connections, etc. The tables can be accommodated in separate storage circuits (registers) in each PSM or in the main storage of each PSM which principally contains the buffer areas (storage sections) for data packets.

Each processor module contains at least the following four tables:

Associated PSM table (for retransmission):
Designates for each line which processor module is assigned to it for output availability monitoring and contains its retransmission queue.

Source line table:
Contains for each active source line (line on which data packets originally enter the nodal system) an identification of the existing virtual connection and data identifying the destination (exit) node.

Destination line table:
Contains for each active destination line (local line on which data packets exit from the nodal system) an identification of the existing virtual connection.

Routing table:
Entries associate destination nodes to respective trunk lines carrying data to said nodes for exiting retransmission.

These four tables have the same contents in all PSM units of a given node. The contents are loaded or changed by the node control module NCM. The associated PSM table is changed only in case of failure of a module or other reconfiguration of the switching node. The source line and destination line tables are changed with the establishment of each new virtual connection. The routing table is changed in accordance with the traffic situation of the total network. The changes are actually made when alternate routing paths between pairs of nodes are determined to be available. The time required for table changes is a very small fraction of the total working time of the processor modules PSM.

A further table contained in each processor module is the storage allocation table. It contains for each section (i.e. each page frame useful for data packet storage) indication as to whether it is allocated or released, occupied or empty and if applicable the identity of the associated input line. This table is loaded by the respective processor module so that the various processor modules have different contents in their storage allocation tables.

The formats of the table entries are seen in the following table II:

TABLE II
FORMAT OF PSM TABLE ENTRIES a. Associated PSM Table (APT)
  (for data packet retransmission)
  2 Bytes — Output Line No.
  1 Byte — Associated PSM (for output queue maintenance and output line availability monitoring)
b. Source Line Table (SLT)
  2 Bytes — Connection No.
  2 Bytes — Source Line No.
  2 Bytes — Destination Node No.
  3 Bytes — Miscellaneous Information
c. Destination Line Table (DLT)
  2 Bytes — Connection No.
  2 Bytes — Destination Line No.
  1 Byte — LAM No. of Destination Line
  4 Bytes — Miscellaneous Information
d. Routing Table (RTT)
  2 Bytes — Destination Node No.
  2 Bytes — Trunk Line No.
  1 Byte — LAM No. of Trunk Line
e. Storage Allocation Table (SAT)
  2 Bytes — Storage Section No.
  2 Bytes — Input Line No.
  4 Bytes — Miscellaneous Information (whether allocated, released, etc.)

OPERATION

FIG. 5 shows details of a processor and storage module PSM relevant to performance of operations required to execute a data packet transfer through the respective switching node.

a. Transfer Between LAM Unit and PSM Unit

Data is received character by character in line buffer 11 (FIG. 4) of the line attachment module. When four characters (bytes) are assembled an internal transfer block is generated containing the four characters and the PSM address stored in the address register which is associated to the respective line. The ITB is shifted through output buffer 21 (FIG. 4) to BUS 27. The addressed PSM unit receives the ITB from the BUS via its interface unit 29 (FIG. 5) and shifts it through input buffer 31 into processor section 33 where it is analyzed and processed. Analogously the transfer in the opposite direction, i.e. from a PSM to an LAM, is effected by the reverse procedure.

b. Allocation of Storage Section

It is assumed that a virtual connection has been established by corresponding entries into tables. When a line gives notice of an initial data packet transmission the associated LAM unit sends a control format ITB, containing a storage allocation request and the address of the respective line, to the processor module identified in the address register for the respective line. The block is forwarded over BUS 27, interface unit 29 and input buffer 31 to processor 33 which also serves for controlling all operations of the module unit. The request for storage allocation in the control ITB is recognized by the processor and with the aid of entries in the storage allocation tables 35 it is determined whether a storage section is available. If this is the case an association between the line and the storage section is made by a corresponding entry.

Processor 33 then generates another internal transfer block by which the requesting LAM unit is notified of the storage allocation and of the initial address of the respective storage section. The block proceeds through output buffer 37, interface unit 29 and BUS 27 to the requesting LAM unit.

If the addressed PSM unit has no free storage capacity it inserts into the original control ITB the address of a neighboring PSM unit. The latter address is stored in a predetermined register 51 and can be changed by node control module NCM for system reconfiguration (e.g. to compensate for failure of a module). The addressed PSM then forwards the control ITB through output buffer 37 to the BUS (as explained above). In the neighboring PSM unit the ITB block is again analyzed and storage allocation is attempted, etc. Finally one PSM unit is able to allocate the requested storage section and communicates this fact by an appropriate ITB to the requesting LAM unit which thereupon loads the address of the accepting PSM unit into the address register of the respective line.

c. Data Packet Buffering

After a storage section has been allocated groups of four received characters (bytes) of the data packet are transferred by internal transfer blocks (data format ITB's) to the accepting processor module and queued in input buffer 31. By reference to the contents of storage allocation tables 35 addressing circuitry 39 accesses the storage section in storage 41 allocated for the associated data packet and the four byte groups are transferred into storage 41 through input transfer circuitry 43. This is repeated until the complete data packet is contained in storage 41.

d. Retransmission, Control and Monitoring

Operations in the accepting processor modules may now vary depending on whether the respective node is an origin ("point of entry") node, a transit (intermediate) node, or a destination ("point of exit") node for the data packet. In the source node a header is generated containing the destination node address and the connection number which are taken relative to the source line from the connection tables. In a transit node the destination node address is derived from the received header. In source and transit nodes the trunk line route to the associated destination node is determined from the connection (routing) table. In the destination node the local (exit) line to which the data packet is to be sent is determined by the contents of the connection table.

The accepting processor module generates a pointer word containing data identifying the received data packet and the address of the storage section in which it is stored. It transfers this pointer word in an appropriate internal transfer block format through BUS 27 to a second processor module which has availability monitoring responsibility for the line attachment module through which the data packet must be retransmitted. The address of this second processor module is extracted from the associated PSM connection table by reference to the output line number. All connection tables are contained in storage block 45.

It should be noted that in some cases the first and the second processor module, i.e. the processor module storing the data packet and the processor module controlling the scheduling of its retransmission are identical. In this case of course the pointer word is not transferred over the BUS but only within the PSM. Also it should be noted that the cooperation between specific first and second processor modules is for single data packet transfers relative to specific virtual connections. Because, however, usually a large number of data packet transfers for many virtual connections are being executed simultaneously in any node each processor module may be a partner in many different module pairs and may operate in some pairs as the first (receiving) processor module and in other pairs as the second (retransmission scheduling) processor module.

In the second processor module the pointer word is loaded into a queue storage block 47 which contains separate output queues for the pointers of individual output lines. Each line notifies its status changes, particularly the availability for a data packet retransmission, through its line attachment module to the processor module to which it is associated for pointer queue storage and output availability monitoring. These notifications are also effected by internal transfer blocks. When a line becomes available for data packet transmission the corresponding output queue in storage block 47 of the associated PSM is scanned by processor 33 and the oldest pointer word is extracted. From the extracted pointer word the "second" PSM unit determines the address of the "first" PSM unit and the storage location in the latter of the data packet which is next to be transferred. By means of an internal transfer block ITB a transfer request is now sent to the first processor module.

There, the data packet is extracted character by character (four bytes or characters at a time) from storage 41 and transferred by means of data format internal transfer blocks through BUS 27 directly to the retransmitting line attachment module LAM. In the LAM unit (FIG. 4) each data format ITB is inserted into an input buffer 19 and then the data bytes are shifted through the corresponding line buffer 11 to the line which is part of the path to the destination. The LAM address and the line address for each such transfer is extracted by the PSM from connection tables 45 with the aid of the destination node data in the header of the data packet, and inserted into each internal transfer block. After each transfer the next four bytes are requested by the line attachment module from the first processor module. The address of that processor module is contained in the internal transfer block.

e. Release of Storage Section

If a data packet is received in the next switching node or in the destination node without error a corresponding acknowledgement is returned to the second processor module responsible for retransmission scheduling in the preceding node via the associated LAM. Processor 33 in this PSM unit then deletes the pointer word in its queue storage 47 so that the next pointer becomes "active" ("advances" to the head of the queue). Furthermore this processor generates an internal transfer block containing a release message which is addressed to the first processor module in which the original representation of the correctly retransmitted data packet is still stored. In response to the release message, processor 33 in the first PSM unit changes the allocation entry in its storage allocation table 35, so that the storage section occupied by the data packet is effectively released for another transfer.

Should an error occur during retransmission of a data packet notification is made to the second PSM unit which thereupon causes a repeat transfer of the respective data packet by sending an appropriate internal transfer block to the first PSM unit.

Storage areas 35 (storage allocation tables), 45 (connection tables), and 47 (output queue storage) can be separate storage circuits. They can, however, also be contained in the general store 41 of each processor module under particular addresses.

EXAMPLES

The following values can be assumed for a switching node as described:

| | | | |
|---|---|---|---|
| Processing speed of each PSM processor: | $5 \cdot 10^5$ Instructions per sec. | | |
| Storage capacity in PSM: | min. $48 \cdot 2^{10}$ Bytes | | |
| | max. $96 \cdot 2^{10}$ Bytes | | |
| Data packet length: | 1,600 Bits | | |
| Data block rate per terminal: | 4 per minute | | |
| Total number of terminals: | 1,000 | 5,000 | 20,000 |
| Total throughout M bits/s | 0.13 | 0.65 | 2.6 |
| Total throughout packet/s | 81 | 405 | 1,620 |
| Total number of PSM modules: (assuming 60% utilization) | 2 | 10 | 40 |

CONCLUSIONS

Figure 6:
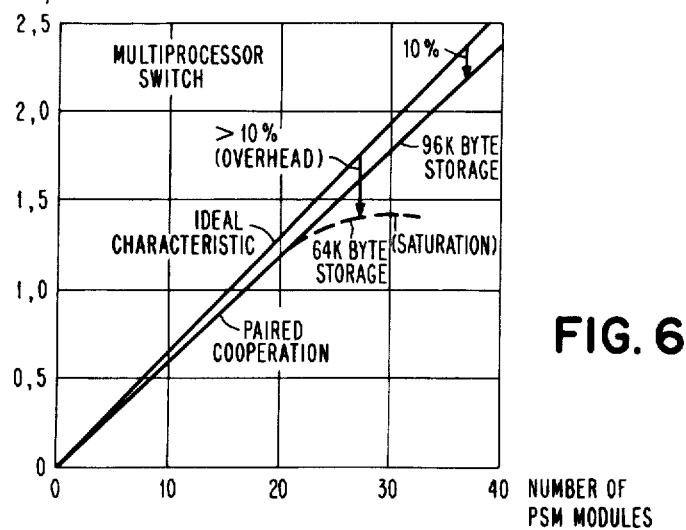
FIG. 6 shows diagrammatically the relative reduction in efficiency associated with an increase in the number of combined processor modules in a system of the kind disclosed.

With the suggested separation of functions and described multi-processor switching structure the additional overhead for administrative operations, which increases with each addition of a processing unit, can be reduced to a significant extent. In conventional prior art systems comprising plural processor modules saturation throughput efficiency is realized with relatively few modules while in the ideal case the efficiency should increase linearly with the number of processor modules. By the novel solution disclosed presently an almost ideal behavior can be achieved; i.e. if each module has enough storage capacity (96 K bytes), the decrease in accumulated efficiency reaches about 10% as the number of processor modules is increased (see FIG. 6). If a smaller storage of e.g. 64 K bytes is used saturation will occur, but only when 25 or 30 processor modules are combined.

In this manner a modular design of switching nodes for a very high throughput capacity of e.g. 2 M bits/s is possible.

While the invention has been particularly shown and described with reference to a preferred embodiment thereof, it will be understood by those skilled in the art that various changes in form and detail may be made therein without departing from the spirit and scope of the invention.

What is claimed is:

1. For switching data in store-and-forward mode, between any two of a multiplicity of ports, a plurality of switching processor modules each variously connectible with any of said ports and each characterized in that it comprises:

means allocatable for storing data in packet units subject to variably delayed forward retransmission;

means for allocating said storing means in response to requests for allocation;

means for designating packet storage allocations of said storing means and forward scheduling assignments of said modules relative to said ports, and routing information;

input transfer means for transferring data from any port, relative to which the respective module has been assigned packet storage responsibility, to a location in the respective storing means designated by said designating means;

means for developing and exchanging supervisory information with other said modules relative to: a)

the status of packet storage in the storing means of the respective and other modules; and b) the status of availability, for forward transfers, of certain of said ports for which the respective module has exclusive assignment for forward scheduling and of others of said multiplicity of ports for which the other modules have exclusive assignments for forward scheduling; and output transfer means for forward transferring each data packet stored in the respective storing means to a said port designated by said routing information designated by said designating means when the designated port is indicated to be available by availability status information provided by operation of said developing and exchanging means.

2. Switching arrangement according to claim 1, characterized in that:

line attachment modules are provided between respective sets of said ports and all of said switching processor modules; each attachment module comprising at least one buffer register for data storage for each port of the respective set and a connection address register for each port of the respective set for designating a switching processor module associated connectively with the respective port for data transfers;

said switching processor modules and line attachment modules being adapted for interchange of control information including said requests for allocation between any line attachment module and any switching processor module in uniformly formatted internal transfer block message units, and for interchange of data between any designated location in any said storing means and any buffer register of an associated port.

3. Switching arrangement according to claim 1, characterized in that said means for designating in each switching processor module comprises means for storing data indicating connection assignments of all of said switching processor modules for transfer of data packets relative to any of said ports.

4. Switching arrangement according to claim 2, characterized in that each line attachment module includes an address register for designating a specific one of said switching processor modules for forward scheduling association with the respective line attachment module to schedule forward packet transmissions relative to ports of the respective set; said specific one of said modules monitoring the availability of said respective attachment module for forward transfer, queueing forward transmission requests of all switching processor modules connectively associated with the respective attachment module and scheduling executions of said requests by respective switching processor modules.

5. Switching arrangement according to claim 1, characterized in that each switching processor module includes an address register associated with said means for allocating, said address register designating the address of another switching processor module to which requests for allocation are to be forwarded in case of non-availability of storage space in the storing means of the respective switching processor module.

6. Switching arrangement according to claim 1, including a common node control module operable independently of said switching processor modules for executing functions other than functions directly involved in effectuating data transfer between ports, said node control module being connected to all other modules of said arrangement.

7. Switching arrangement according to claim 2 characterized in that direct connections are provided between said line attachment modules to permit selective establishment of circuit-switched connections between any two line attachment modules.

8. Method of operating a nodal packet switch for store-and-forward data exchange characterized in that for transfer of each data packet through the node the following operations are performed:

data is transferred from a first port to an allocated storage section of a first one of a plurality of switching processor modules connectible to said port;

upon assembly of said stored data in a packet a retransmission request is transferred to a second one of said switching processor modules which has exclusive responsibility for determining the availability of a second port over which the data packet is to be forwarded;

an availability indication is transferred from the second switching processor module to the first switching processor module when said second port is available to accept the data packet; and responsive to said availability indication the data packet is transferred by said first switching processor module from said allocated storage section to said second port.

9. Method according to claim 8, characterized in that in the second switching processor module, a pointer word containing address indications for the data packet to be transferred, is inserted into a queue storage area which is associated with the second port over which the data packet is to be forwarded, and that each time the respective second port becomes available for a data packet transmission, the oldest pointer word in said associated gueue is extracted and used to cause forward transmission of a data packet from the switching processor module in which it is stored over said second port.

10. Method according to claim 8, wherein groups of ports subject to operation as said first and second ports are serviced by line attachment modules, characterized in that allocation of each said data packet storage section is effectuated by exchange of supervisory request information between the line attachment module associated with the first port and a switching processor module pre-assigned to handle requests relative to said first port.

11. Method according to claim 10 characterized in that in case of non-availability of storage space to fulfill said request the request is forwarded from said pre-assigned module to a predetermined other switching processor module designated to act in such circumstance as surrogate for said pre-assigned module, and that upon allocation of a storage section in said other switching module the location of this other storage section is indicated to the respective line attachment module for enabling said respective attachment module to pass data from said first port to said other storage section directly without assistance from said preassigned module.

12. Method according to claim 8, characterized in that upon receipt of acknowledgement of correct forward transmission of a data packet from said node, a corresponding message is sent from the second switching processor module to the first switching processor module causing cancellation of the stored representation of the respective data packet and any corresponding allocation and status indication in both switching processor modules; and in that in the event an error message is returned relative to the forwarded data packet, the second switching processor module sends to the first switching processor module a request for a repeated forward transmission of the data packet, a representation of which it still stores.

* * * * *